(12) United States Patent
Kette (10) Patent No.: US 11,337,572 B2
(45) Date of Patent: May 24, 2022

(54) ENVIRONMENTAL CONTROL UNIT FOR DUST AND ODOR CONTROL

(71) Applicant: Enviropur LLC, Bay Village, OH (US)

(72) Inventor: Dave Kette, Bay Village, OH (US)

(73) Assignee: Enviropur LLC, Bay Village, OH (US)

( * ) Notice: Subject to any disclaimer, the term of this patent is extended or adjusted under 35 U.S.C. 154(b) by 548 days.

(21) Appl. No.: 16/165,019

(22) Filed: Oct. 19, 2018

(65) Prior Publication Data

US 2019/0117030 A1  Apr. 25, 2019

Related U.S. Application Data

(60) Provisional application No. 62/575,107, filed on Oct. 20, 2017.

(51) Int. Cl.
| | |
|---|---|
| *B01D 53/02* | (2006.01) |
| *A47L 9/10* | (2006.01) |
| *A47L 9/12* | (2006.01) |
| *A47L 9/28* | (2006.01) |
| *A47L 9/16* | (2006.01) |

(Continued)

(52) U.S. Cl.
CPC ............ *A47L 9/102* (2013.01); *A47L 7/0085* (2013.01); *A47L 7/0095* (2013.01); *A47L 9/12* (2013.01); *A47L 9/122* (2013.01); *A47L 9/16* (2013.01); *A47L 9/2821* (2013.01); *A47L 9/2842* (2013.01); *A47L 9/2868* (2013.01); *B01D 45/16* (2013.01); *B01D 46/446* (2013.01); *B01D 46/46* (2013.01); *B01D 46/62* (2022.01); *B04C 9/00* (2013.01); *B01D 50/20* (2022.01);

(Continued)

(58) Field of Classification Search
CPC ...... A47L 7/0085; A47L 7/0095; A47L 9/102; A47L 9/12; A47L 9/122; A47L 9/16; A47L 9/2821; A47L 9/2842; A47L 9/2868; B01D 2279/40; B01D 2279/55; B01D 45/16; B01D 46/0023; B01D 46/446; B01D 46/46; B01D 50/002; B04C 2209/002; B04C 9/00
See application file for complete search history.

(56) References Cited

U.S. PATENT DOCUMENTS

| | | | |
|---|---|---|---|
| 5,096,474 A | | 3/1992 | Miller, Jr. et al. |
| 5,243,732 A | * | 9/1993 | Koharagi .............. A47L 9/2821 15/319 |

(Continued)

*Primary Examiner* — Christopher P Jones
(74) *Attorney, Agent, or Firm* — Eschweiler & Potashnik, LLC (57) ABSTRACT

An environmental control unit comprises a housing, a vacuum cleaner, a filtration unit, and a blower. The vacuum cleaner is positioned in the housing and is configured to receive a tool contaminant stream produced by at least one tool. The vacuum cleaner filters particulate matter from the tool contaminant stream, thereby producing a filtered air stream. The filtration unit is also positioned within the housing and comprises at least one filter. The blower is positioned within the housing downstream of the filtration unit. The blower is configured to create negative air pressure within the second compartment to draw an area contaminant stream from an exterior of the environmental control unit into the housing. A second blower may also be present. The blower draws the filtered air stream and the area contaminant stream through the at least one filter in the filtration unit to produce a filtered mixture stream.

11 Claims, 9 Drawing Sheets

(51) Int. Cl.
    *B01D 45/16*     (2006.01)
    *B04C 9/00*     (2006.01)
    *B01D 46/44*     (2006.01)
    *B01D 46/46*     (2006.01)
    *A47L 7/00*     (2006.01)
    *B01D 46/62*     (2022.01)
    *B01D 50/20*     (2022.01)

(52) U.S. Cl.
    CPC ...... *B01D 2279/40* (2013.01); *B01D 2279/55* (2013.01); *B04C 2009/002* (2013.01)

(56) References Cited

U.S. PATENT DOCUMENTS

| | | |
|---|---|---|
| 5,461,368 A | 10/1995 | Comer |
| 7,806,961 B2 | 10/2010 | Carlson et al. |
| 8,491,685 B2 | 7/2013 | Witter et al. |
| 2009/0193973 A1 | 8/2009 | Woods |
| 2011/0203238 A1* | 8/2011 | Witter ................ B01D 46/0093 55/356 |
| 2012/0003919 A1 | 1/2012 | Wiener |
| 2016/0206988 A1* | 7/2016 | Bohrer ................ B01D 46/429 |

\* cited by examiner

ENVIRONMENTAL CONTROL UNIT FOR DUST AND ODOR CONTROL

CROSS-REFERENCE TO RELATED APPLICATIONS

This application claims the benefit of priority to U.S. provisional application 62/575,107, filed on Oct. 20, 2017, which is herein incorporated by reference in its entirety.

FIELD

This disclosure relates to an environmental control unit for receiving and filtering dust associated with renovating a desired space.

BACKGROUND

The task of renovating a workspace or living space typically generates a significant amount of dust, debris, particulate matter, and odor as the building materials are removed. Dust not only undesirably accumulates on the ground and surrounding items in the room but may also become airborne and remain as buoyant dust that affects breathing and sight. In conventional filtration systems, dust may also accumulate on a filter in the filtration system, thus decreasing a flow rate across the filter. As a result, a conventional filtration system may become less effective over time as dust accumulates on a filter. Accordingly, it is beneficial to reduce or eliminate both the visible debris as well as airborne dust from a renovation site to not only improve working conditions, but also aesthetically enhance the renovation site.

SUMMARY

An improved environmental control unit is disclosed herein. The environmental control unit comprises a housing, a vacuum cleaner, a filtration unit, and a blower. The housing defines a hollow interior. The vacuum cleaner is positioned in the housing and is configured to receive a tool contaminant stream produced by at least one tool. The tool contaminant stream may be received by the vacuum through a hose connecting the vacuum to the at least one tool. The vacuum cleaner filters particulate matter from the tool contaminant stream, thereby producing a filtered air stream. The filtration unit is also positioned within the housing and comprises at least one filter. The at least one filter may be a mesh filter, a pleaded filter, a high-efficiency particulate absorption (HEPA filter), an antibacterial filter, a carbon filter, or combinations thereof. The blower is positioned within the housing downstream of the filtration unit. The blower is configured to create negative air pressure within the second compartment to draw an area contaminant stream from an exterior of the environmental control unit into the housing. The blower draws the filtered air stream and the area contaminant stream through the at least one filter in the filtration unit to produce a filtered mixture stream.

In an embodiment, the housing of the environmental control unit may be attached to a means for moving (e.g., a set of wheels) to facilitate movement of the environmental control unit. The environmental control unit may also comprise a controller which is electrically coupled to the blower. The controller is configured to increase a speed of the blower as particulate matter from the tool contaminant stream and the area contaminant stream accumulate on the at least one filter in order to maintain a constant flow rate through the at least one filter. The environmental control unit may also comprise a cyclonic dust separator configured to separate larger solid matter from smaller dust particulate matter in the tool contaminant stream.

A method of making an environmental control unit comprises sculpting a housing defining a hollow interior. A vacuum is then attached inside the housing. A filtration unit comprising at least one filter is attached within the housing. A blower is then attached downstream of the filtration unit within the housing. Additional components, such as a means for moving and/or a controller may also be attached to the housing.

A method of using an environmental control unit comprises positioning the above described environmental control unit within a renovatation space. A tool is attached to the environmental control unit through a hose. The tool produces a tool contaminant stream, which is drawn into the vacuum to produce a filtered air stream. An area contaminant stream is drawn into the environmental control unit and through the filtration unit along with the filtered air stream to produce a filtered mixture stream.

The term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

DETAILED DESCRIPTION

An environmental control unit for receiving and filtering dust associated with renovating a desired space is disclosed herein. The environmental control unit combines, as a unitary packaged unit, equipment and associated functionality for air handling while helping to afford protection to occupants in an enclosed or confined space against airborne dust, contaminants, and odors during residential and/or commercial renovation projects. More specifically, the environmental control unit is directed at removing process dust produced by a dust generating machine e.g., sanding machine, saw, drywall sander, floor sander, and grinder), demolition, construction, and painting and separating the dust from exhaust air flowing from the machine as well as residual buoyant dust. The environmental control unit removes the production dust from the work area and maintains environmental control through negative air pressure and a source vacuum in the contaminant area.

Figure 1:
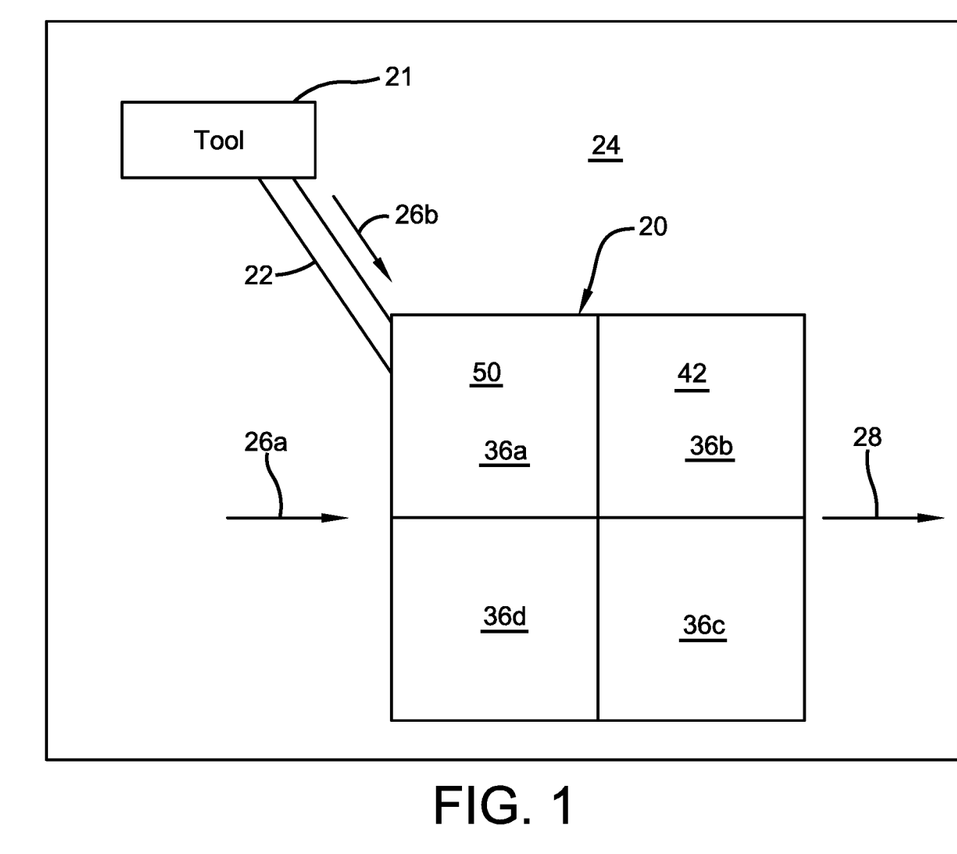
FIG. 1 is a schematic illustration of an environmental control unit.
Figure 2:
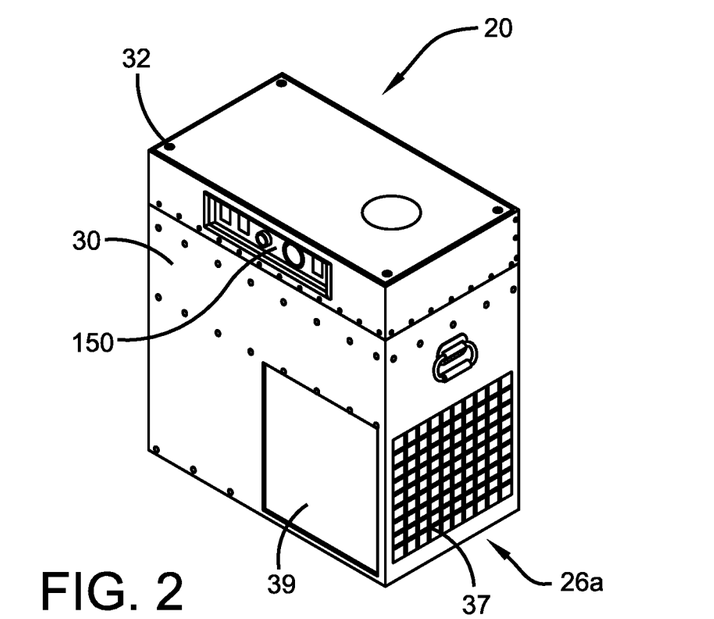
FIG. 2 is a perspective view of an exemplary environmental control unit.
Figure 3:
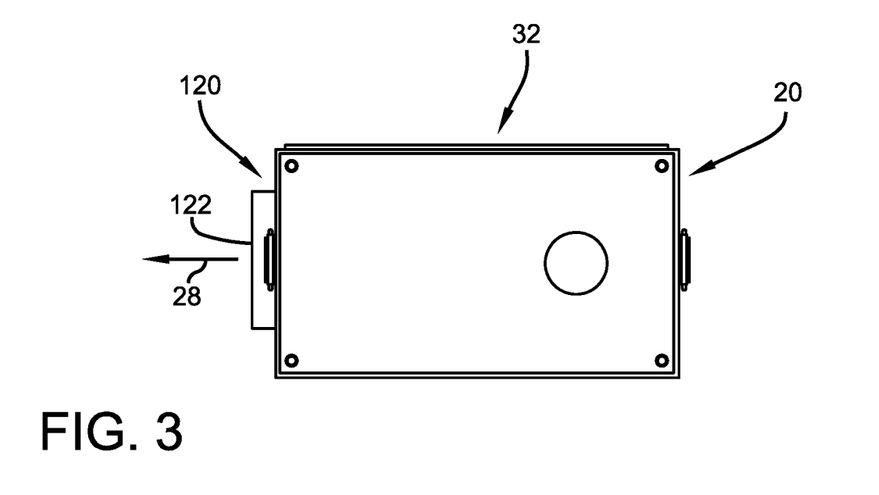
FIG. 3 is a top view of the exemplary environmental control unit of FIG. 2.
Figure 4:
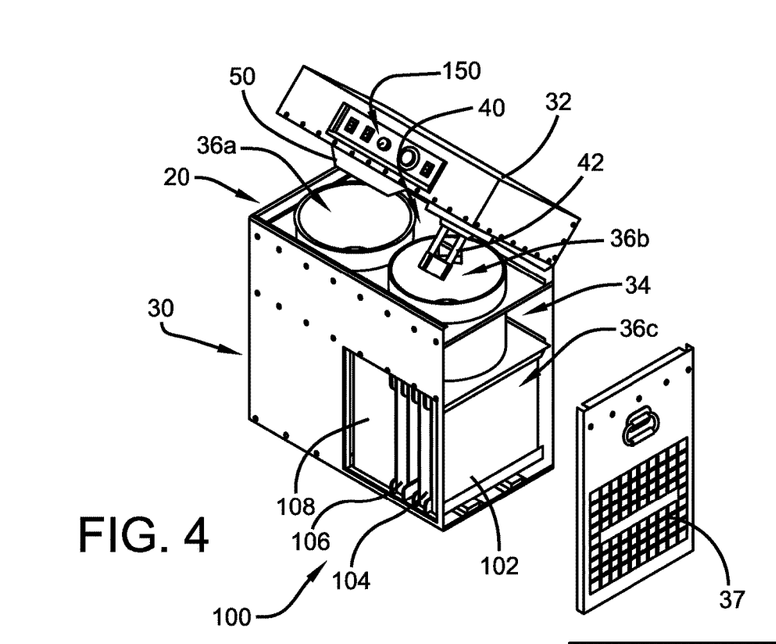
FIG. 4 is a perspective view of the exemplary environmental control unit of FIG. 2 with the lid open and a panel removed.
Figure 5:
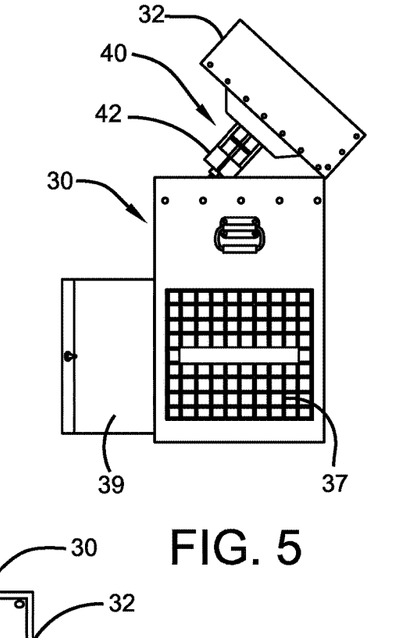
FIG. 5 is an end view of the exemplary environmental control unit of FIG. 2 with the lid open and an access door open.
Figure 6:
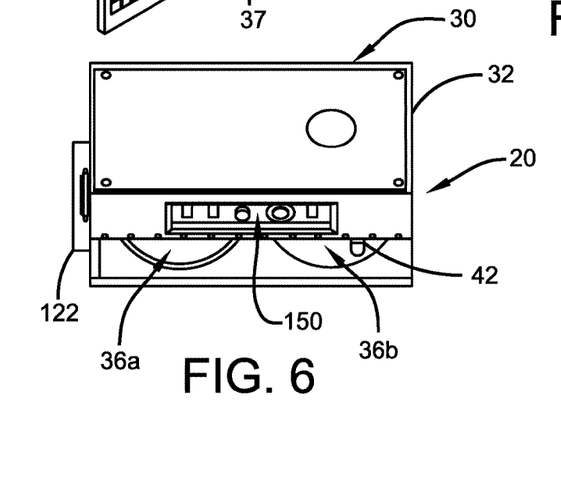
FIG. 6 is a top view of the exemplary environmental control unit of FIG. 2 with the lid open.

FIG. 1, illustrates a general schematic for an embodiment of the environmental control unit 20. As shown in FIG. 1, the environmental control unit 20 uses three combined systems of dust removal and control. First, air is drawn from a source tool 21 using a vacuum hose 22 attached to the environmental control unit 20. This enters a cyclonic dust separator 50 in a first upper compartment 36a, and the air passes into a second upper compartment 36b where a vacuum head 42 resides. The residual air is then deposited into first and second lower compartments 36c, 36d of the environmental control unit 20, where a negative air pressure is built up. In addition, the negative air in the first and second lower compartments 36c, 36d of the machine draws residual buoyant dust and odors through four stages of HEPA filtration 36c before being exhausted into an adjacent area, window, ceiling plenum or exterior of the renovated area using lay-flat duct. A third part of the system further cleans and enhances the environment by utilizing sealed containment of the renovated area using plastic sheeting, tension poles, and window and door portals.

The vacuum system may work in at least two ways—Option 1: when the source tool is activated, the vacuum motor turns on. On release (break) of the source tool, the vacuum continues to run for a predetermined period of tune, e.g., 8 seconds. Option 2: the vacuum is "all on" with normal shop vacuum controls. The vacuum uses an on-off-on switch with two relays.

The negative air machine, e.g. a blower, may be controlled by a variable speed controlled motor, the speed can be varied through an electronic controller, capacitor control, resistance control (for DC power), or a variable frequency drive. The variable speed controlled motor is configured to maintain a negative pressure despite filter clogging. This may be accomplished by using a differential pressure transducer. The pressure difference between internal pressure across the filters is constantly monitored and automatically ramps up or down the blower motor to achieve constant negative pressure. As the filters become filled with dust or the size of the containment area changes, the machine automatically adjusts blower speed to maintain constant negative pressure. In an embodiment, a filter sensor, such as an imaging, laser, optical, or other sensor, sends an audible and visual alarm when the filters need to be changed. To maintain in-flow under electrical surges on start-up, the system uses a soft start module to control power surges (caused by the starting of power tools and HEPA vacuum). In an embodiment the amperage for the entire environmental control unit is kept under 20 amps when in use, such as under 15 amps. The soft start module works in conjunction with low amperage motor drives, such as the variable frequency drive to allow for two blowers and one or more tools to stay under the 15 amp limit.

FIGS. 2-9 illustrate several views of an exemplary environmental control unit 20. These figures are referred to as a group since many of the features are shown in multiple figures.

In use, the environmental control unit 20 is placed in an enclosed space 24 where it is desirable to remove dust and odor generated during particulate generating activities such as renovating an interior space, e.g., living room, bathroom or office space. The environmental control unit 20 receives several contaminant streams 26a, 26b containing a mixture of air, exhaust gasses, and dust and outputs a single, filtered mixture stream 28 that is substantially free of dust, particulate, odor, etc.

The area contaminant stream 26a originates from the space 24 surrounding the environmental control unit 20 and constitutes residual, buoyant dust and odors that become airborne in the space during and following renovation. The tool contaminant stream 26b originates from one or more source tools 21 which generate dust and which are used for renovating the space 24, e.g., sanding machine, saw, drywall sander, floor sander, grinder, etc. A vacuum hose 22 extends to and is connected to the tool(s) 21. The vacuum hose 22 draws in debris, dust, exhaust gases, odors, and air generated by and around the tool 21 and delivers the mixture as the tool contaminant stream 26b to the environmental control unit 20. The vacuum hose 22 may have a diameter ranging from 0.5 to 5 inches. For example, the vacuum hose 22 may have a diameter of, for example, 0.75 to 4.5 inches, 1 to 3 inches, or 1.5 to 2 inches.

Figure 11A:
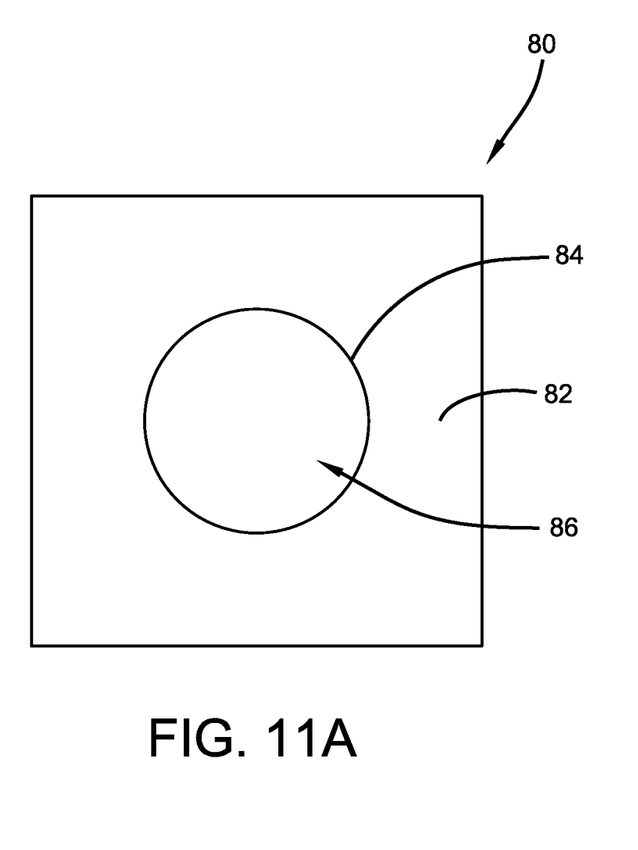
FIGS. 11a and 11b are front and side views of an exemplary adaptor for venting filtered air out of the space.
Figure 11B:
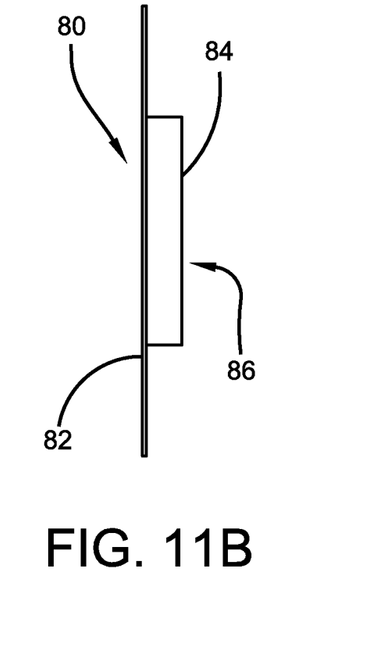

The environmental control unit 20 removes the dust, odor(s), and any particulate matter from the contaminant streams 26a, 26b and outputs the filtered mixture stream 28 to the adjacent area, ceiling plenum or exterior of the space 24 using ducting or the like. In one example, the ducting directs the filtered mixture stream 28 out of a window to and near the space 24 via a window unit, such as shown in FIGS. 11a and 11b. The environmental control unit 20 may also comprise a means for moving the unit 20 (e.g., wheels) to facilitate movement of the environmental control unit 20 to make it portable.

The environmental control unit 20 includes a housing 30 that contains a vacuum cleaner 40, filtration unit 100, blower 120, and controller 150. The housing 30 has a generally rectangular prism shape and includes a series of walls and a lid 32 that cooperate to define an interior space 34. The lid 32 is removable or hinged to the housing 30 to selectively access the interior space 34 for maintenance, etc. Interior walls in the housing 30 divide the interior space 34 into a plurality of compartments 36a-36d. As shown, the interior space 34 is separated by walls into first and second upper compartments 36a, 36b and first and second lower compartments 36c, 36d. It will be appreciated, however, that these spatial designations may vary based upon the spatial orientation of the environmental control unit 20. The first and second upper compartments 36a, 36b are fluidly connected to one another and the first and second lower compartments 36c, 36d are fluidly connected to one another. By "fluidly connected" it is meant connected by a tube or duct or other structure capable of transporting fluids. The second upper compartment 36b is fluidly connected to the first lower compartment 36c by an opening or passage 38 through one of the interior walls of the housing 30. A fluid flow path exists through the environmental control unit 20 from an intake opening 37 in the housing 30, through the first and second lower compartments 36c, 36d, and to an exhaust opening 122 in the housing.

The vacuum cleaner 40 is provided in the lid 32 and extends into the first and second upper compartments 36a, 36b of the interior space 34. The vacuum cleaner 40 may constitute a HEPA (high-efficiency particulate arrestance) vacuum that meets government standards. More specifically, the HEPA vacuum 40 may be capable of removing—from the air passing through it—99.97% or more of particles in the air. The filter primarily removes particles having a size of 0.2 nm or larger. The vacuum cleaner 40 includes a head 42 and a cyclonic dust separator 50 positioned within the first and second upper compartments 36a and 36b, respectively, and fluidly, e.g. through tube capable of transporting a fluid, connected to the head. The vacuum cleaner 40 may include a second blower unit, or optionally, may rely solely on the main blower 120 described below to pull air through the vacuum cleaner and filter.

The cyclonic dust separator 50 includes an inlet 54a, 54b extending outward through the lid 32 and an outlet 56 that extends through the lid to the second upper compartment 36b within the housing 30. In an embodiment, the inlet 54a, 54b is dual inlet, at least one of which, e.g., 54a, is connected to the vacuum hose 22, which extends to and is connected with the tool 21 used for renovation that generates dust, as previously disclosed. A second tool may also be connected to the inlet 54b via a hose. If one inlet 54a, 54b is not used it is sealed instead.

The cyclonic dust separator 50 cooperates with the vacuum head 42 to create vortex separation that remove particulates from the tool contaminant stream 26b without the use of physical filters. More specifically, rotational effects and gravity are used by the cyclonic dust separator 50 to separate mixtures of solids and fluids, e.g., dust particulate and air. When the vacuum cleaner 40 is turned on, the incoming tool contaminant stream 26b enters the inlet 54a from the hose 22 and is separated into contaminants and air through the cyclonic dust separator 50. The contaminants and other unwanted particles fall via gravity into the first upper compartment 36a while a residual, filtered air stream 29 passes through the outlet 56 and into the second upper compartment 36b (see FIG. 9, which shows a bottom panel 33 of the lid 32).

The filtered air stream 29 from the vacuum cleaner 40 passes through the opening 38 (see FIG. 7) from the second upper compartment 36b to the first lower compartment 36c where the filtration unit 100 is located. A seal 35 may be located around the opening 38 and between the second upper compartment 36b and the first lower compartment 36c. The filtration unit 100 includes a series of filters 102, 104, 106, 108 (or first, second, third, and fourth filters 102-108) that act in stages to further remove particulate in filtered air stream 29. The filters 102-108 may have different configurations and varying degrees of porosity to specifically remove various solids and unwanted particles, e.g., dust, pollen, mold, bacteria, etc., from the filtered air stream 29. In one example, four filters are provided and include a mesh filter 102, a pair of pleated filters 104, 106, and a high efficiency particulate air (HEPA) filter 108. In another embodiment, the four filters may additionally include an anti-bacterial filter and/or a carbon filter. Moreover, the filtration unit may have a mount designed to accept the HEPA filter 108. It will be appreciated, however, that more or fewer of each filter 102-108 may be used or that filters having greater or lesser porosity may be used. This further allows for adjustment of the environmental control unit 20 for the environment that it will be used in. The filters 102-108 may have the same thickness or width or different thicknesses to vary the flow path of the filtered air stream 29 and tool contaminant stream 26a through the filtration unit 100. The filters 102-108 may have increasing filtration grades as the filtered air stream 29 moves downstream (right to left as viewed in FIG. 7) and subsequent filters, e.g., the pore size of filters may decrease in the downstream direction through the environmental control unit 20.

Figure 7:
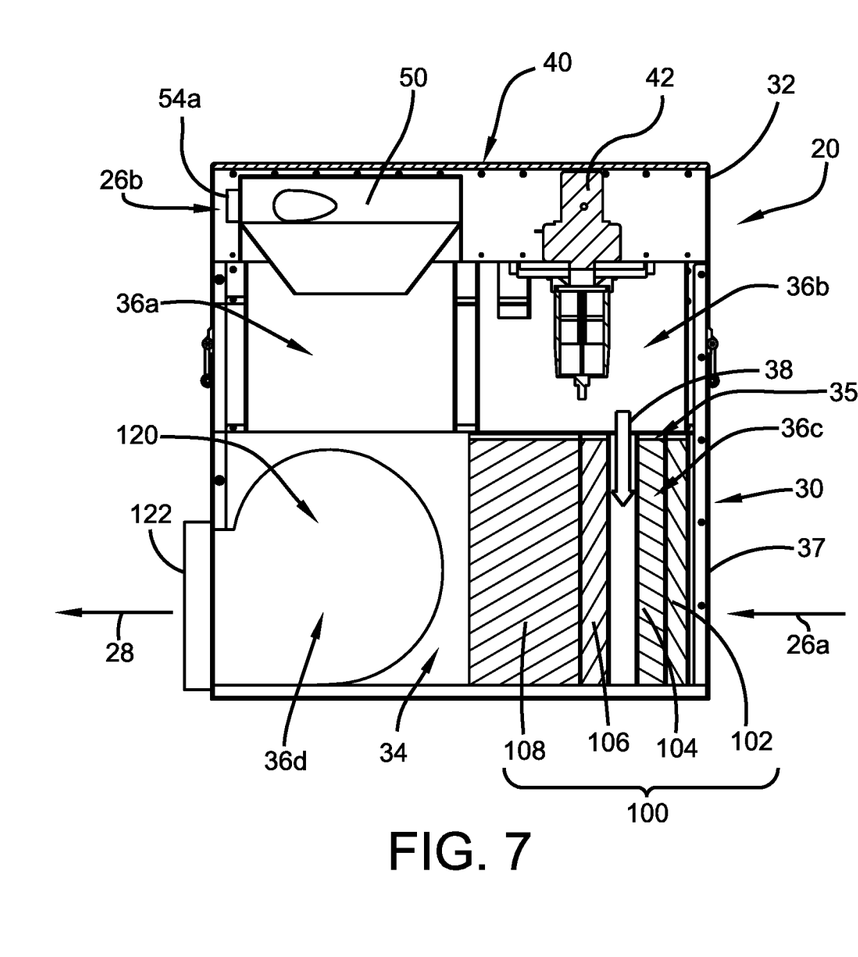
FIG. 7 is a side cross-sectional view of the exemplary environmental control unit of FIG. 2
Figure 8:
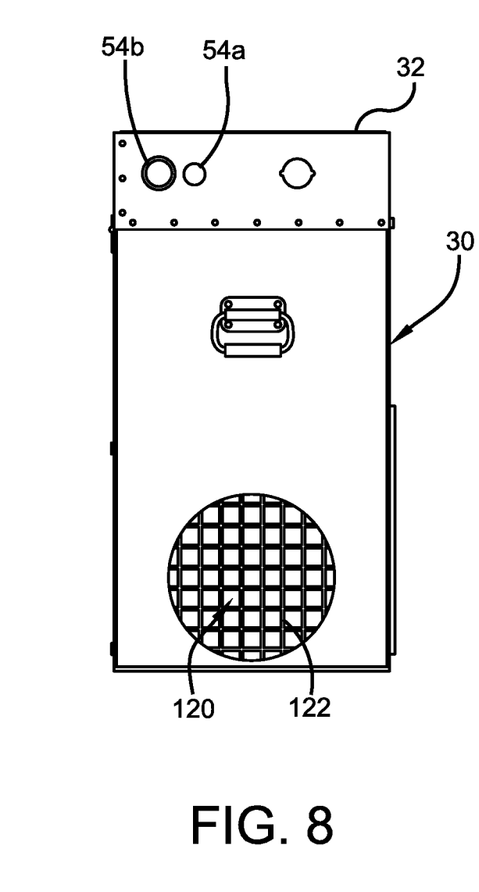
FIG. 8 is an end view (opposite of FIG. 5) of the exemplary environmental control unit of FIG. 2.
Figure 9:
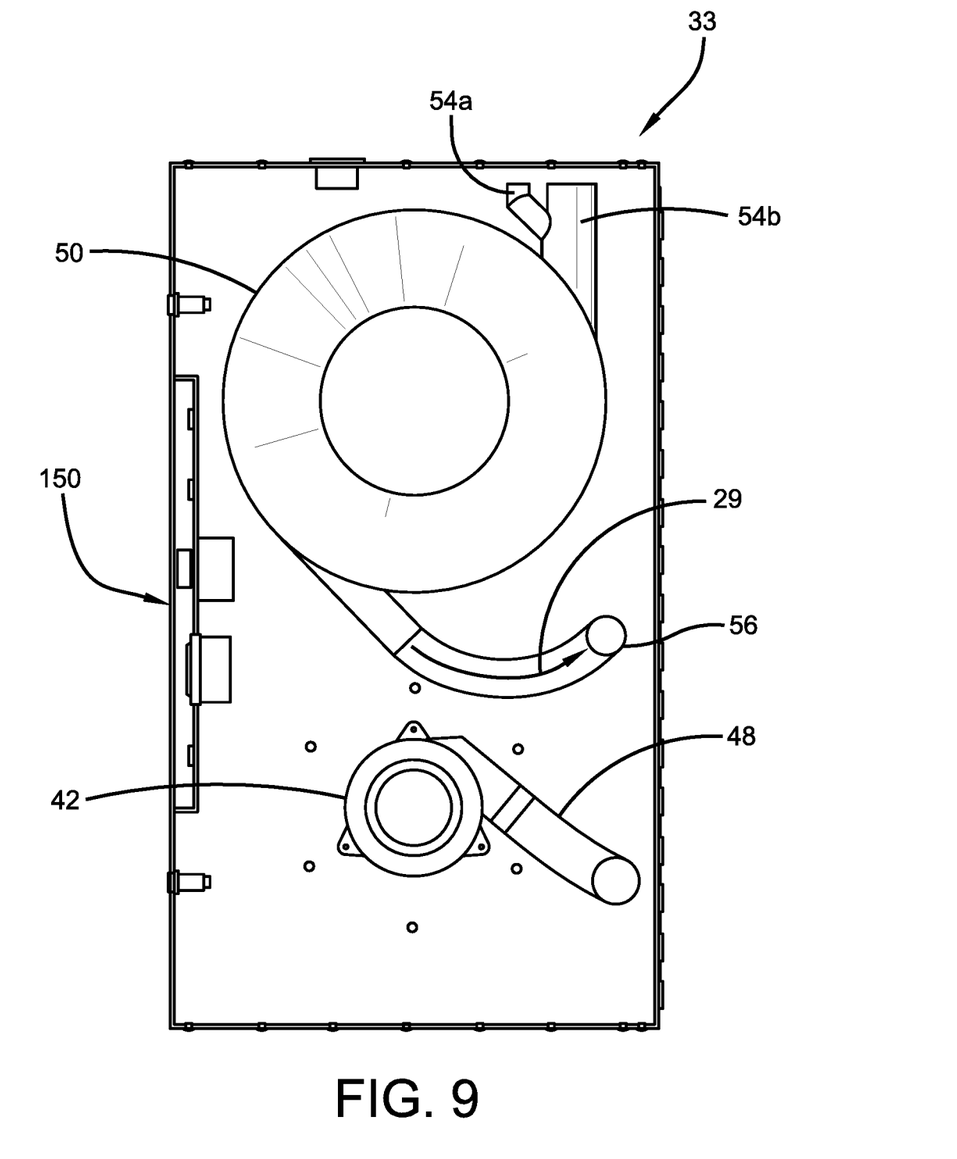
FIG. 9 is an isolated top view of a bottom panel of the lid of the exemplary environmental control unit of FIG. 2.

The filtered air stream 29 passes from the second upper compartment 36b through the opening 38, into the first lower compartment 36c and downstream through the pleated filter 106 and the HEPA filter 108 towards the exhaust opening 122 in the housing 30. The exhaust opening 122 is fluidly connected to the area adjacent to the environmental control unit 20, a ceiling plenum, or to a location outside the space 24 via ducting, such as lay-flat duct. The filtered air stream 29 is therefore further filtered and contaminants removed as it passes through the filtration unit 100 and reaches the exhaust opening 122 as a filtered mixture stream 28.

A blower 120 is provided in the second lower compartment 36d and extends outward through the housing 30 so as to be in fluid communication with the space 24. The blower 120 may include the exhaust opening 122 or be in fluid communication therewith. The blower 120 is selectively actuated to create negative air pressure within the first and second lower compartments 36c, 36d and thereby draw the area contaminant stream 26a into the environmental control unit 20 through the intake opening 37. In an embodiment, the blower 120 may be an axial fan.

During or after renovation, the air in the space 24 may include buoyant dust and odors, which is undesirable. The blower 120 may be turned on to draw the air/dust mixture forming the area contaminant stream 26a into the environmental control unit 20 via the intake opening 37 and through the filtration unit 100. More specifically, the area contaminant stream 26a passes through the intake opening 37 to the first lower compartment 36c, sequentially through each of the filters 102, 104, 106, 108 and into the second lower compartment 36d, where it is expelled out of the environmental control unit 20 as the filtered mixture stream 28 by the blower 120 at the exhaust opening 122.

Turning the blower 120 on not only draws in the area contaminant stream 26a into the filtration unit 100 but also draws the filtered air stream 29 from the vacuum cleaner 40 through the opening 38, and into the filtration unit 100 where it is combined with the area contaminant stream 26a, drawn through the filtration unit, and ultimately expelled as the filtered mixture stream 28 as described.

Since the vacuum 40 and blower 120 can be operated simultaneously, the environmental control unit 20 advantageously removes dust and particulates from the work area in the vicinity of the tool(s) 21 being used for renovation as well as dust and particulates from the air within the renovatation space 24. The filtered mixture stream 28 produced from the incoming contaminant streams 26a, 26b may be recirculated into the renovatation space 24 or may be exhausted elsewhere via ducting.

Figure 10:
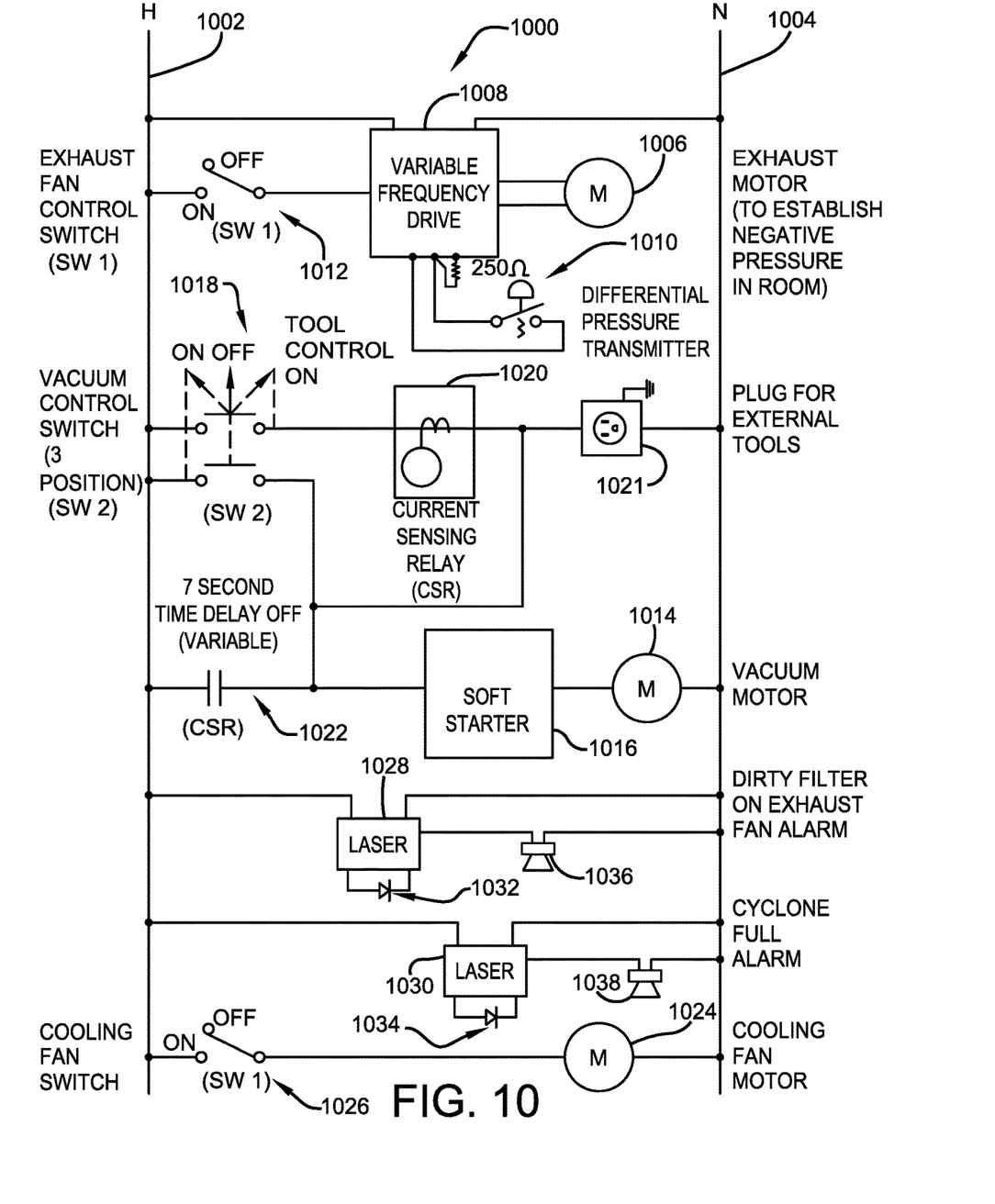
FIG. 10 is a schematic illustration of the controller used to operate the environmental control unit.

A general schematic of the controller 150 that may be used to control operation and maintenance of the environmental control unit 20 is illustrated in FIG. 10. FIG. 10 is an exemplary depiction of the controller 150 and it will be understood that modifications or alternative configurations for the controller are contemplated to achieve the objectives described. Capabilities and control options of the controller 150 not specifically described herein will be readily recognizable to those having ordinary skill in the art upon studying FIG. 10.

FIG. 10 illustrates via a schematic diagram representation 1000, the components that may be found within an example controller 150 of the environmental control unit 20. In this embodiment, the variable speed controlled motor is a variable frequency drive. The schematic diagram representation 1000 includes an H voltage rail 1002 and an N voltage rail 1004, between which the circuit components are connected in series, in parallel, or in a combination of series and parallel. The schematic diagram representation 1000 includes an exhaust motor 1006 wherein the velocity of the exhaust motor 1006 (i.e., the strength of the exhaust motor 1006) can be controlled by a variable frequency drive 1008. The variable frequency drive 1008 is configured to adjust the speed of the exhaust motor 1006. The variable frequency drive 1008 may receive information pertinent for establishing negative pressure in a room using a differential pressure transmitter 1010 in communication therewith. For example, the differential pressure transmitter 1010 may sense an influx of pressure in the room and then proceed to communicate the sensed influx pressure to the variable frequency drive 1008. The variable frequency drive 1008 may then, in turn, adjust the speed of the exhaust motor 1014.

To turn the variable frequency drive 1008, and all of the components associated with the variable frequency drive 1008, on or off, an exhaust fan control switch 1012 may be connected in series from an input power source (e.g., an energized H-rail) to the variable frequency drive 1010. The variable frequency drive 1008 may also be connected directly to the H and N rails. It is to be noted that a switch can be connected in multiple locations in the circuit.

The schematic diagram representation 1000 also shows a vacuum motor 1014 in the circuit. To protect the vacuum motor 1014 from high inrush currents (e.g., typically present during start up), a soft starter 1016 is placed in series prior to the vacuum motor 1014. To allow for a current to pass through the vacuum motor 1014, a three-position vacuum control switch 1018 is placed in series as a preliminary device for other components capable of affecting the vacuum motor 1014. The vacuum control switch 1018 allows for two general modes of operation for the vacuum motor 1014. In the first mode of operation, the vacuum control switch 1018 is set such that a source tool plugged into an outlet 1020 of the environmental control unit will activate the vacuum motor 1014 when the source tool is activated. Upon release (i.e., turning off, disconnecting) of the source tool, the vacuum motor 1014 may continue to run for a set amount of time before turning off, the set amount of time can be chosen from a range of possible values (e.g., from 0 seconds to 20 seconds, or 5 to 15 seconds). In the second mode of operation, the vacuum control switch 1018 can be set such that the vacuum motor 1014 can be turned "all on", regardless of whether the source tool is activated. Further, the switch can be set to an "off" setting wherein the switch disconnects the vacuum motor 1014 from a power source. The vacuum motor 1014 can be affected by current sensing relays 1020, 1022.

To cool system components, the schematic diagram representation 1000 includes a cooling fan motor 1024. The cooling fan motor 1024 can be turned on or off via a cooling fan control switch 1026. The schematic diagram representation 1000 includes laser sensors 1028, and 1030 to sense for filter maintenance/replacement and a full cyclone compartment respectively. Each of the laser sensors 1028, 1030 can provide a visual signal (e.g., a light emitting diode 1032, 1034) and/or an audio signal (e.g., via a speaker 1036, 1038). In an embodiment, one or more of the laser sensors 1028, 1030 can communicate to the variable frequency drive 1008 a signal indicating that the speed of the exhaust fan driven by the motor 1006 needs to be increased, in the event that the filter begins loaded with contaminants affecting the flow. Typically, flow rate decreases as filters become loaded with contaminants. This increase can also be accomplished by the differential pressure transducer 1010 when the differential pressure drops below a threshold level.

In an embodiment, all circuits in the environmental control unit 20 can be consolidated onto one board for modularity. In an embodiment, the flow rate of the filtered mixture stream 28 can be controlled by a user within limits. In an embodiment, defeat switches are employed to prevent operation of the environmental control unit 20, if access doors and/or filters are absent. In an embodiment, a defeat switch can be used to prevent operation of the tool if the vacuum is not operating, such as by cutting power to the outlet 1020. In an embodiment, the environmental control unit 20 can be shut-down automatically if the filters are detected to be loaded to a predetermined threshold. In an embodiment, there is an electro-static ground to prevent discharge, arcing, and fire to protect the electronics.

In an embodiment, the housing further comprises an electrical outlet for a tool and the controller 150 is configured to prioritize providing stable current to the variable frequency drive 1008 when the tool is powered on or off.

The controller 150 is positioned within the lid 32 and is electrically connected to the blower 120 and the vacuum cleaner 40 for selectively controlling operation thereof. The controller 150, as well as other circuitry within the environmental control unit 20, may be incorporated into a single circuit board. In particular, the controller 150 may adjust the speed of the blower 120 using a variable frequency drive 1008. Consequently, the blower 120 speed may be adjusted based upon the size of the renovation space 24 being renovated and/or the airflow through the filtration unit 100. The blower 120 speed may be adjusted such that a predetermined magnitude of negative pressure is maintained through the environmental control unit 20. To this end, one or more pressure sensors or transducers, such as electronic manometers may be provided in the first and second lower compartments 36c, 36d and/or the first and second upper compartments 36c, 36d and connected to the controller 150 to monitor the pressure differential across the blower 120, and/or across one or more of the filters 102-108, and/or through the first and second upper compartments 36c, 36d.

The controller 150 is also associated with the filtration unit 100 to monitor the condition of the filters 102-108 therein. In particular, one or more sensors, e.g., lasers, are provided in the first lower compartment 36c and monitor the degree of dust and debris on the filters 102-108 and provide visual or audio warnings indicating that the filter(s) needs replacement. To this end, each sensor may cooperate with a receiver on an opposite side of the filters 102-108 in a known manner. The sensor may provide a pass/fail indication that the signal is capable of being transmitted through the filter 102-108. A clean filter will allow the laser to pass through to the receiver while a filter retaining sufficient dust and particulate will prevent passage of the laser therethrough to trigger the warning. In an embodiment, the sensor may monitor differential pressure within the environmental control unit 20, such as monitoring pressure across one or more of the filters 102-108. When the differential pressure exceeds a certain threshold as particulate matters accumulates on the filters 102-108, the sensor may provide an indication that the filters need to be replaced. In an embodiment, the warning may also trigger a time to automatic shutdown. When the time has elapsed, the controller 150 may cause the environmental control unit 20 to automatically shut down. The housing 30 may include a side door 39 (shown open in FIG. 5) that can be used to access the first lower compartment 36c to repair or replace the filters 102-108 of the filtration unit 100. The environmental control unit may also be configured with an electrostatic ground in order to prevent discharge, arcing, and fire.

The environmental control unit 20 may also be configured with various safeguards in order to prevent operation when a component is missing from the environmental control unit (e.g., during maintenance of the environmental control unit 20). In an embodiment, the environmental control unit 20 may be configured to shut down when the side door 39 is opened. In another embodiment, the environmental control unit 20 may be configured to shut down when one or more of the filters 102-108 is missing. In yet another embodiment, the environmental control unit 20 may be configured to shut down when a hose is not attached to the vacuum hose 22.

It is understood that as dust and other particulate matter accumulates on the filters 102-108, flow rates of contaminant streams 26a, 26b and filtered air stream 29 within the environmental control unit may decrease. Thus, in an embodiment, the controller 150 may increase a speed of the blower 120 as particulate matter accumulates on the filters 102-108 in order to maintain a constant flow rate of the area contaminant stream 26a and filtered air stream 29 across the filters 102-108. In another embodiment, a user of the environmental control unit 20 may specify a flow rate of the contaminant streams 26a, 26b and filtered air stream 29 by the controller 150.

FIGS. 11a and 11b illustrate an adaptor 80 to which the ducting may be attached in order to vent the filtered mixture stream 28 out of the space 24. The adaptor is sized and configured to readily fit in an airtight manner into a conventional room opening, such as a ceiling tile, a window, or a door. The adaptor 80 is sized to replace a ceiling tile within the space 24 and includes a base 82 and a flange 84 for receiving the ducting. An opening 86 extends entirely through the flange 84 and the base 82 to allow the filtered mixture stream 28 to pass through the adaptor 80 and into the ceiling. In any case, one having ordinary skill in the art, however, will appreciate that alternative adaptors may be configured to pass the filtered mixture stream 28 through any opening or structure in the space 24 having known dimensions. Consequently, the dimensions shown are exemplary and not exhaustive of the size and shape of adaptor for use with the environmental control unit. Furthermore, the ducting may constitute more than one fluid conduit to allow the filtered mixture stream 28 to pass to and through multiple openings or structures in the space 24. An additional means of controlling the dust and debris associated with renovating the space 24 includes sealing the space using plastic sheeting, tension poles, and window and door portals for ingress and egress as is known in the art.

Figure 12:
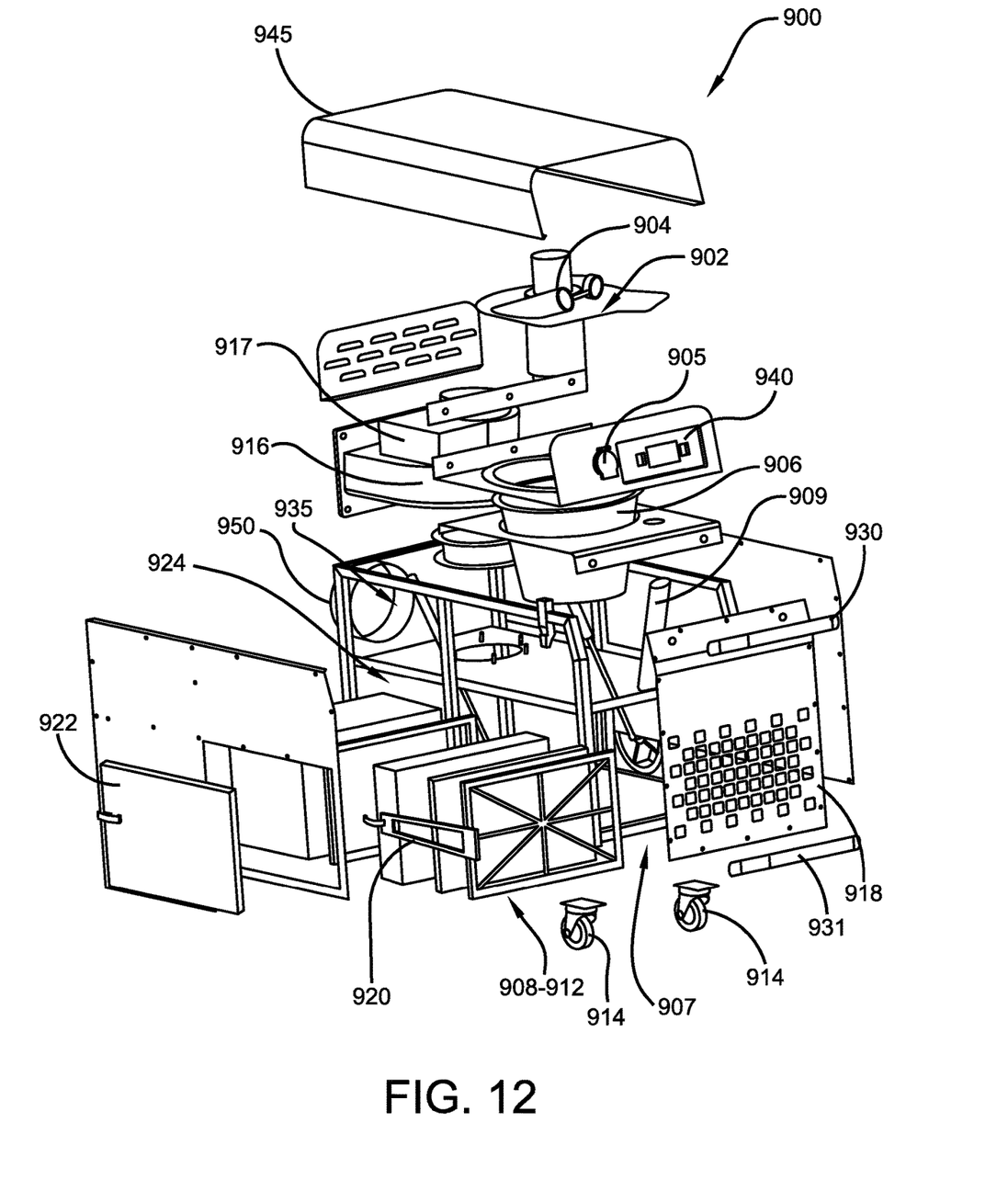
FIG. 12 is an exploded perspective view of a second exemplary environmental control unit.
Figure 13:
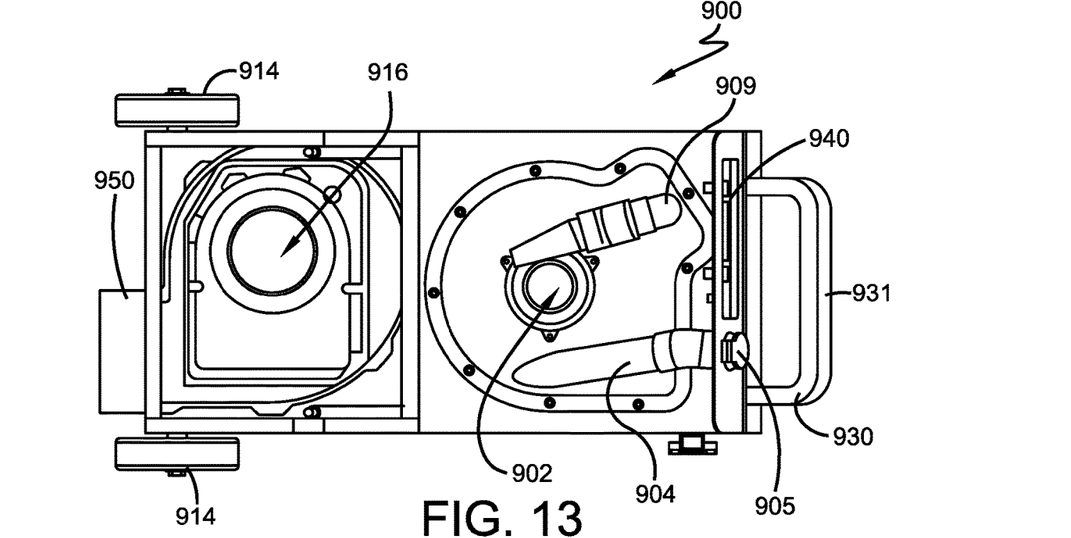
FIG. 13 is a top view of the second exemplary environmental control unit of FIG. 12 with the top cover removed.
Figure 14:
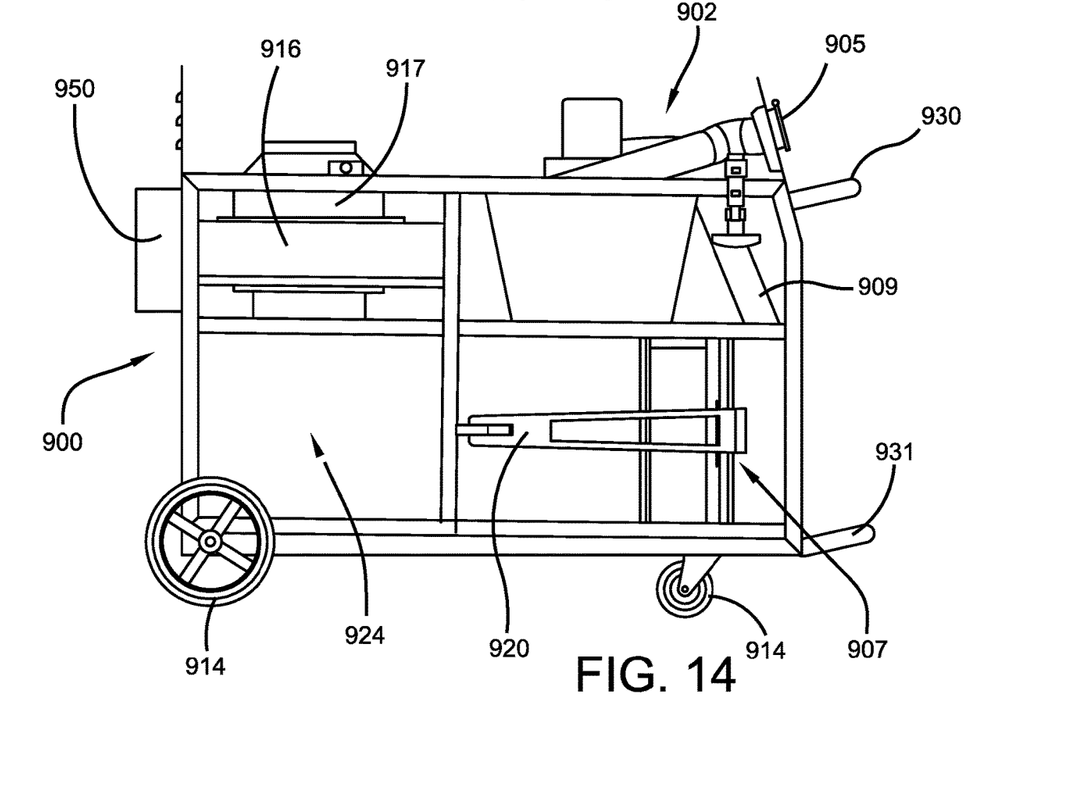
FIG. 14 is a side cross-sectional view of the second exemplary environmental control unit of FIG. 12.

FIGS. 12-14 illustrate another exemplary environmental control unit 900. The environmental control unit 900 comprises a vacuum cleaner 902. The vacuum cleaner has an conduit 904 that can be connected to a port 905 that, in turn, can be coupled to a hose. Another end of the hose may be attached to a tool (not shown) that produces a tool contaminant stream 26b of particulate and/or solid matter. The environmental control unit 900 may also comprise a cyclonic dust separator 906, which may be considered part of the vacuum 902. The cyclonic dust separator 906 is configured to separate fluids from solid particulate matter in the tool contaminant stream 26b, thus producing a filtered air stream 29 which then passes through filters 908, 910, 912. The solid particulate matter may be retained in a waste bin (not shown) that can be emptied or cleaned out periodically. An area contaminant stream 26a also enters the unit 900 through grating 918. The area contaminant stream 26a also passes through the filters 908-912, but by-passes the vacuum cleaner 902. In an embodiment, the filtered air stream 29 passes from the vacuum 902 through the cyclonic dust separator 906 into the filtration compartment 907 through a tube 909. In an embodiment, as shown in FIGS. 12-14, the tube 909 enters the filtration compartment 907 upstream of all the filters 908-912. In another embodiment the tube 909 may enter the filtration chamber between any of the filters 908-912. For example, the tube 909 may enter the filtration chamber between the outermost and middle filter 908, 910, since the filtered air stream 29 has already had larger solid particulates removed in the cyclonic dust separator 906, and the outermost filter 908 may be a filter for large particles only.

In an embodiment, the vacuum 902 does not include the cyclonic dust separator 906, and air passes into the filtration unit first. Optionally, it may be filtered or separated in another manner prior to passing into the filtration compartment 907.

The environmental control unit 900 further comprises a blower 916, powered by a variable speed controlled motor 917. In this embodiment, the blower is housed in the lid and or upper compartment 935 of the environmental control unit 900. The blower 916 creates a negative air pressure within the environmental control unit 900 such that the filtered air stream 29 and the area contaminant stream 26a are drawn through the filters 908, 910, 912, thereby producing a filtered mixture stream 28 which is expelled from the environmental control unit 900. The filters 908, 910, 912 may be any of the types of filters previously described. A mechanical means 920 for pushing or holding the filters against a surface is used to keep the filters in place and to substantially prevent air from flowing around the filters, instead of passing through them. As shown, this is a rigid clamp holding all the filters together. An access panel 922 is removable or hingedly attached to allow access to remove the filters 908-912.

The blower 916 is mounted at a 90 degree angle to the filters 908-912, and spaced apart from the filters 908-912 by an open chamber 924 in the interior of the housing.

The blower 916 is coupled to an exhaust vent 950, where the filtered mixture stream 28 exits the unit 900. Typically, ducting will be attached to the exhaust vent 950, and lead out of the space or room where it exhausts to an exterior space. This maintains a negative pressure in the room to aid in drawing in air to the unit 900 to both the grating 918 and tool.

The blower 916 is electrically and/or mechanically coupled to a variable speed controlled motor 917 and controlled by a controller, as described above, that functions to cause the pressure across a filter 908-912, or in other locations within the unit to be substantially constant. This helps to ensure continuous high levels of filtering even after filters are heavily dirtied. The term "substantially constant" as used herein, may mean within 15%, within 5%, within 2%, within 1%, or within 0.1% of a predetermined baseline value.

The front of the unit 900 includes top and bottom handles 930, 931. A top cover 945 can be affixed to the top of the unit 900. A control panel 940 with controls to turn the unit 900 off and on, optionally adjust pressure, and optionally display other features or options is on the front of the unit 900. The environmental control unit 900 may also comprise a means for moving 914 that facilitates movement of the environmental control unit. In the embodiment shown in FIGS. 12-14, the means for moving 914 is a set of wheels.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

What is claimed is:

1. An environmental control unit comprising:
   a housing having a hollow interior;
   a vacuum cleaner positioned in the housing, the vacuum cleaner configured to receive a tool contaminant stream from at least one tool coupled to the vacuum cleaner, the vacuum cleaner includes a cyclonic dust separator and optionally a filter, wherein the cyclonic dust separator separates solid particulate matter from the tool contaminant stream, and the vacuum cleaner exhausts an air stream;
   a filtration unit comprising at least one filter, the filtration unit positioned in the housing; and
   a blower positioned within the housing downstream of the filtration unit, wherein the blower creates negative air pressure within the housing to draw an area contaminant stream from an exterior of the environmental control unit into the housing, wherein the blower draws the air stream and the area contaminant stream through the filtration unit to produce a filtered mixture stream;
   wherein the blower is driven by a variable speed controlled motor;
   wherein the at least one filter comprises a first filter and a second filter, and the filtered air stream enters the filtration unit between the first filter and the second filter, and the area contaminant stream enters the filtration unit before the first and second filter.

2. The environmental control unit of claim 1 wherein the variable speed controlled motor is a variable frequency drive.

3. The environmental control unit of claim 1 further comprising:
   a controller, wherein the controller increases a speed of the blower as particulate matter from the tool contaminant stream and the area contaminant stream accumulate on the at least one filter to maintain a substantially constant flow rate through the at least one filter.

4. The environmental control unit of claim 1 further comprising:
   a sensor that senses a pressure across the at least one filter, and signals the pressure information to a controller, the controller being configured to increase the speed of the blower to maintain a substantially constant pressure across the at least one filter.

5. The environmental control unit of claim 1 further comprising:
   a sensor configured to monitor particulate matter accumulation on the at least one filter, wherein the sensor outputs an indication to replace the at least one filter when the particulate matter accumulation exceeds a threshold amount.

6. The environmental control unit of claim 1, wherein the at least one filter is a mesh filter, a pleated filter, a high-efficiency particulate arrestance (HEPA) filter, an anti-bacterial filter, a carbon filter, or combinations thereof.

7. The environmental control unit of claim 1, wherein the at least one tool is connected to the vacuum cleaner by a hose.

8. The environmental control unit of claim 1, wherein the vacuum cleaner includes a second blower and removes at least 99.97% of particles in the tool contaminant stream.

9. The environmental control unit of claim 1, wherein the blower creates negative air pressure within the housing to draw both the tool contaminant stream and area contaminant stream into the housing.

10. The environmental control unit of claim 1, wherein the housing further comprises an electrical outlet for the tool that produces the contaminant stream or another tool and a controller is configured to prioritize providing stable current to the variable frequency drive when the tool is powered on or off.

11. The environmental control unit of claim 1, further comprising circuitry that controls power within the device and comprising a soft start module that limits amperage of the unit to under 20 Amps, while providing sufficient power to the blower, a second blower coupled to and powering the vacuum cleaner, and the at least one tool.

* * * * *